Nov. 14, 1961   E. J. RAUE ET AL   3,009,013
ELECTRICAL INSULATOR WITH COMPRESSION RING SEAL
Filed April 15, 1958

Inventors,
Emil J. Raue,
Howard M. Graham,
by Gilbert P. Tarleton
Their Attorney.

United States Patent Office 3,009,013
Patented Nov. 14, 1961

3,009,013
ELECTRICAL INSULATOR WITH COMPRESSION RING SEAL
Emil J. Raue, Schenectady, N.Y., and Howard M. Graham, Livermore, Calif., assignors to General Electric Company, a corporation of New York
Filed Apr. 15, 1958, Ser. No. 728,573
5 Claims. (Cl. 174—152)

The present invention relates to electrical insulators, such as insulating bushings, and more particularly to electrical insulators joined with fluid-tight seals to metal parts and to the method of making such seals.

In mounting insulating bushings on electrical apparatus such as transformers, capacitors, circuit breakers and the like, various means have previously been employed for making tight seals between the bushing and the metal support on which it is mounted or other metal parts attached to the bushing. The prior methods have not, however, provided seals which are uniformly effective or reliable over a long period of time. The common expedient of soldering the parts together has certain drawbacks, such as corrosion resulting from the fluxes used, failures at low temperature, formation of voids and blow holes, inadequate mechanical strength, and the necessity for expensive processing equipment.

The use of resilient gasket materials such as cork, rubber and the like has also often been unsatisfactory, due to porosity of the material caused, for example, by thermal changes under operational conditions, or to low mechanical strength of the resulting seal, especially after prolonged period of use.

It is an object of the invention to provide fluid-tight seals for electrical insulators and a method of making the same which overcome the disadvantages of the prior insulator sealing arrangements and methods.

It is a further object of the invention to provide insulator-to-metal seals which are exceptionally strong, fluid-tight and long-lasting even under severe and varying operational conditions and which are readily made with a minimum of time, labor and expense.

With the above objects in view, the present invention relates to an electrical insulator sealing arrangement which comprises an insulator body having a circumferential surface portion, a relatively ductile metallic body surrounding the surface portion of the insulating body in intimate contact therewith and permanently compressing the same, and a relatively nonductile metallic body of high tensile strength arranged overlying the relatively ductile metallic body and permanently compressing the latter against the insulating surface portion, whereby a strong, fluid-tight joint is formed between the metallic and insulating bodies.

Figure 1:
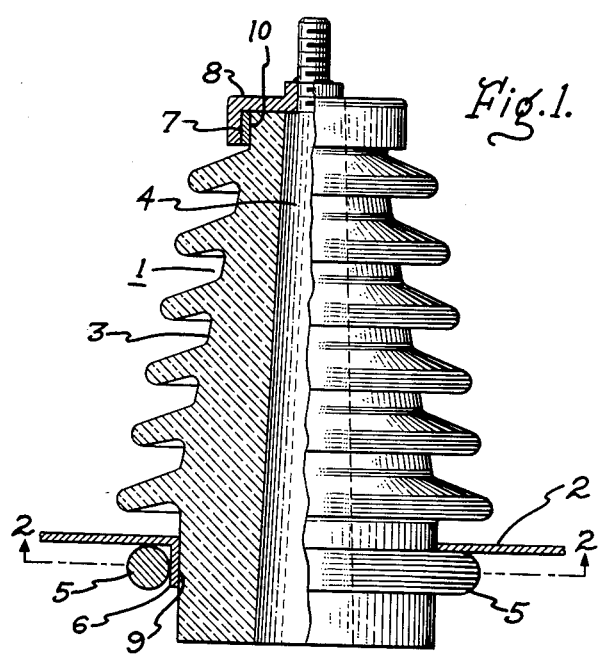
Figure 2:
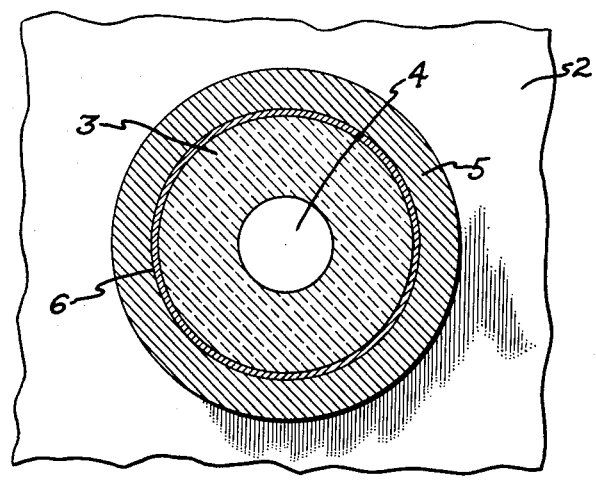

The invention will be better understood from the following description taken in conjunction with the accompanying drawing, in which:

FIG. 1 is a view in elevation, partly in section, of an electrical bushing insulator embodying the present invention mounted on the housing of an electrical apparatus; and FIG. 2 is a cross-sectional view of the device shown in FIG. 1 taken along the line 2—2.

Referring now to the drawing, there is shown an electrical bushing insulator 1 rigidly secured to the wall or cover 2 of an electrical apparatus such as a transformer, capacitor or the like and comprising a shell 3 of insulating material having an axial passage 4 through which a lead conductor (not shown) is adapted to pass into the interior of the electrical apparatus on which the bushing is mounted.

The insulating material of shell 3 is preferably a ceramic or refractory insulating composition such as alumina, glass, porcelain or other similar types of material which have high strength in compression and preferably a low coefficient of expansion, e.g., less than $10 \times 10^{-6}$.

Bushing 1 is securely mounted in an aperture defined by flange 6 of wall 2 by means of ring 5 which holds flange 6 in permanent compression, flange 6 in turn holding bushing shell 3 in permanent compressive contact, as more fully explained hereinafter. The invention is also applicable to the terminal cap structure at the upper end of bushing 1, and as embodied therein, intermediate ring 7 and outer cap 8 are securely joined in tight assembly to bushing 1 by permanent compression, similarly to the mounting arrangement previously described. Cap 8 serves as a mounting base for a terminal structure which may be of usual construction. Surface portions 9 and 10 of bushing 1 which are in the seal region must have a high degree of surface smoothness and roundness which may be attained by grinding or molding.

In accordance with the invention, wall 2 and intermediate ring 7 are relatively thin compared to the outer annular metal parts and are made of a metal which is comparatively ductile and has a coefficient of thermal expansion, e.g., about 10 to $30 \times 10^{-6}$, which is relatively high compared to that of the bushing material. Such metals as low carbon steel or mild steel, silver, copper, tin, lead, and aluminum, and alloys thereof, are satisfactory materials for these components. The inside diameters of rings 6 and 7 normally are slightly smaller than the diameters respectively of surface portions 9 and 10 which they encompass. On the other hand, parts 5 and 8 are made of relatively non-ductile, high tensile strength metals, having coefficients of thermal expansion which are relatively low compared to parts 6 and 7, e.g., about 6 to $12 \times 10^{-6}$. Stainless steel and tool steel, such as nickel steel, have been found particularly satisfactory examples of such metals for making parts 5 and 8. The inner diameters of the latter parts are normally slightly less than the outer diameters respectively of parts 6 and 7.

The particular combination of metals selected for the inner and outer rings should be such that there is a difference of at least $3 \times 10^{-6}$ between their coefficients of expansion, with the inner ring always having the higher coefficient.

In mounting bushing 3 on the metal support 2, the bushing is inserted in position in the aperture defined by flange 6 after the latter is heated to expand the size of the aperture. Flange 6 is then allowed to cool, with the result that it shrinks into a strong, tight fit around the bushing periphery at surface portion 9. Thereafter, outer metal ring 5, having been expanded by heating, is placed over flange 6, and the parts allowed to cool. Upon cooling, ring 5 thermally contracts and shrinks to a tight fit around flange 6 compressing it permanently and tightly against surface portion 9 of the bushing. This assembly forms a firm, fluid-tight seal around the insulating bushing which prevents passage of moisture or gases between the interior of the tank enclosed by wall 2 and the outside atmosphere, and exhibits a high degree of mechanical strength resistant to movement of, or impact on, the bushing or the apparatus tank.

In a manner similar to that described above, the upper terminal structure is joined in gas-tight relation with the upper end of bushing shell 3. Here, ductile metal ring 7 is shrink-fitted by thermal contraction onto seal surface 10 of the bushing, and terminal cap 8 after initially being expanded by heating is placed over ring 7 and allowed to thermally contract to provide a permanent compression on ring 7 and bushing surface 10.

Seal assemblies made in the manner described were subjected to thermo-cycling tests, i.e., exposed to alternating periods of heating and cooling, but this treatment was found to have little or no adverse effect on the seals produced. It appears that the high thermal expansion characteristics of the intermediate seal ring coupled with its ductility serves to compensate for any tendency of the seal components to separate under thermal variations, as well as under mechanical stress or other operational conditions. At the same time, the high tensile strength of the outer ring provides constant compression to maintain the seal during such variations.

In tests made on a bushing mounted in an aluminum capacitor housing in accordance with the invention, using standard halogen leak-test equipment and a test gas under 15 pounds per square inch pressure, no leakage of the test gas through the seal was found. Moreover, a force is excess of 5500 lbs. was required to push the bushing from the housing, the area of the bushing surface in contact with the seal being about 2.6 square inches.

The described method of providing metal seals on insulating bushings by making use simply of thermal action on the parts and their inherent relative ductility and tensile strength makes possible the dispensing of the elaborate equipment and procedures heretofore required for making effective fluid-tight seals of this type. It thus considerably simplifies the sealing procedure and enables substantial reduction of cost, time and labor, while at the same time producing fluid-tight seals of superior mechanical and thermal characteristics and high reliability over long periods of use.

The invention is of particular advantage in the manufacture of a variety of electrical apparatus such as capacitors requiring hermetic bushing seals, transformers which utilize gas or oil for cooling or insulation purposes, and vacuum tubes and similar devices wherein tight seals must be maintained to prevent loss of vacuum, gas, liquids, or pressure, and is especially valuable for operations where the high temperatures of welding or brazing techniques cannot be tolerated or are unsuitable.

In general, it is preferable, in the process of mounting the described bushing insulator in housing wall 2, to heat the metal wall to expand the aperture therein for receiving the bushing, and allow the subsequent thermal contraction of flange 6 to provide the necessary compression on bushing seal surface 9. However, in the alternative, the bushing may merely be pressed, such as by a suitable pressing machine, into the slightly smaller aperture of the wall 2 without heating the latter, and in this manner obtain the desired tight compressive fit of the wall flange around the bushing. For this procedure, it has been found desirable for the bushing seal surface and the wall flange to be correspondingly tapered, e.g., about 3 to 4 degrees, toward the lower end of the bushing. The outer ring 5 would still, however, be thermally expanded before applying it to the flange 6 in the manner already described.

While the present process is of particular advantage in its application to electrical apparatus and insulating devices, it will be evident that it may also find use in other types of devices for providing tight hermetic seals between ceramic or similar materials and metal parts or supporting structures.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A seal construction comprising an insulating body of high strength in compression and having a seal surface portion, a relatively ductile metallic body superimposed on and clasping said seal surface portion in intimate contact therewith and per se permanently compressing the same, and a relatively non-ductile metallic body of high tensile strength overlying and clasping said relatively ductile metallic body and permanently compressing the latter against said surface portion, whereby a strong, fluid-tight joint is formed between said metallic and insulating bodies.

2. A seal construction comprising an insulating body of high strength in compression and relatively low coefficient of thermal expansion having a seal surface portion, a relatively ductile metallic body of relatively high coefficient of thermal expansion superimposed on and clasping said seal surface portion in a shrink fit and permanently compressing the same by thermal contraction, and a relatively non-ductile metallic body of high tensile strength having a coefficient of thermal expansion intermediate the aforementioned coefficients of thermal expansion overlying and clasping said relatively ductile metallic body in a shrink fit thereon and permanently compressing the latter against said surface portion by thermal contraction, whereby a strong, fluid-tight joint is formed between said metallic and insulating bodies.

3. An electrical insulator seal construction comprising an electrical insulating body of ceramic material having a seal surface portion, a relatively ductile metallic body having a coefficient of thermal expansion of about 10 to $30 \times 10^{-6}$ superimposed on and clasping said seal surface portion in intimate contact therewith and per se permanently compressing the same, and a relatively non-ductile metallic body of high tensile strength and a coefficient of thermal expansion of about 6 to $12 \times 10^{-6}$ and at least $3 \times 10^{-6}$ below that of said relatively ductile metallic body overlying and clasping said relatively ductile metallic body and permanently compressing the latter against said seal surface portion, whereby a strong, fluid-tight joint is formed between said metallic and electrical insulating bodies.

4. A seal construction as defined in claim 3, wherein said electrical insulating body is composed of a material selected from the group consisting of porcelain, glass, and alumina, said relatively ductile metallic body is composed of a metal selected from the group consisting of low carbon steel, silver, copper, tin, lead, and aluminum, and alloys thereof, and said relatively non-ductile metallic body is composed of high tensile strength steel and alloys thereof.

5. An electrical insulating device comprising an insulating bushing having a circumferential mounting surface portion, a wall member composed of a relatively ductile metal and having a flanged portion defining an aperture therein in which said insulating bushing is mounted, the diameter of said aperture being normally slightly smaller than the diameter of said surface portion of said bushing, said flanged portion per se holding said bushing surface portion in permanently compressive contact, and an annular relatively non-ductile, high tensile strength metal member normally having an inner diameter slightly smaller than the outer diameter of said flanged wall portion surrounding said flanged portion and holding the same in permanent compression against said bushing surface portion, whereby a strong, fluid-tight joint is formed between said metal members and said insulating bushing.

References Cited in the file of this patent

UNITED STATES PATENTS

| | | |
|---|---|---|
| 351,263 | Hemphill | Oct. 19, 1886 |
| 1,619,969 | Champion | Mar. 8, 1927 |
| 2,147,417 | Bahls | Feb. 14, 1939 |
| 2,394,398 | Mouromtseff et al. | Feb. 5, 1946 |
| 2,508,233 | Dorgelo et al. | May 16, 1950 |
| 2,558,878 | Richardson | July 3, 1951 |
| 2,852,722 | Noon | Sept. 16, 1958 |

FOREIGN PATENTS

| | | |
|---|---|---|
| 659,223 | Great Britain | Oct. 17, 1951 |
| 57,285 | France | Oct. 8, 1952 |
| | (2nd addition to 1,005,363) | |
| 906,595 | Germany | Mar. 15, 1954 |
| 907,092 | Germany | Mar. 22, 1954 |
| 208,032 | Australia | May 10, 1957 |